UNITED STATES PATENT OFFICE.

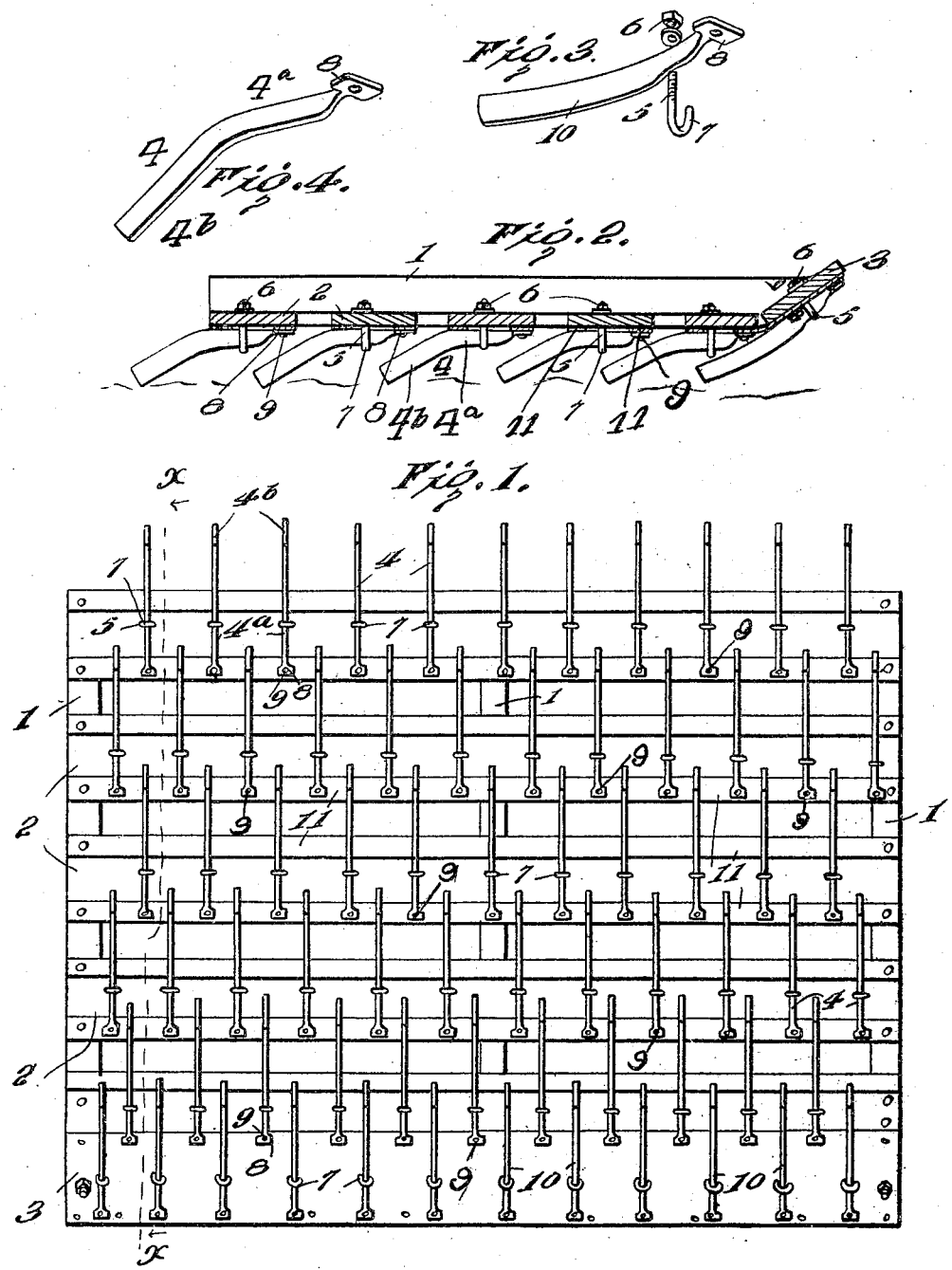

CHARLES W. BOLAND, OF CECIL, OHIO.

HARROW.

No. 799,886. Specification of Letters Patent. Patented Sept. 19, 1905.

Application filed May 8, 1905. Serial No. 259,411.

*To all whom it may concern:*

Be it known that I, CHARLES W. BOLAND, a citizen of the United States, residing at Cecil, in the county of Paulding and State of Ohio, have invented certain new and useful Improvements in Harrows, of which the following is a specification.

This invention embodies an improved agricultural implement, and comprises a novel construction of harrow designed particularly for securing the best results in effectively pulverizing the soil, so as to produce an even seed-bed, the structure of the implement giving rise to far better results than the common types of straight-tooth harrows at present in use.

The implement is not only designed for pulverizing the soil, but is also adapted for use as a drag or weeder in the cultivation of growing corn, as the harrow may be drawn over the ground in such a manner as to kill all of the small weeds without injuring the small stalks of corn, at the same time leaving the soil in excellent condition for later cultivation with the usual corn-plow.

For a full description of the invention and the merits thereof and also to acquire a knowledge of the details of construction of the means for effecting the result reference is to be had to the following description and accompanying drawings, in which—

Figure 1 is a bottom plan view of a harrow embodying the essential features of the invention. Fig. 2 is a vertical longitudinal sectional view on the line X X of Fig. 1. Fig. 3 is a detail perspective view of one of the front teeth. Fig. 4 is a perspective view of one of the main teeth.

Corresponding and like parts are referred to in the following description and indicated in all the views of the drawings by the same reference characters.

Generally describing the construction of the implement embodying the invention and referring to the drawings, the numeral 1 indicates a plurality of longitudinal bars forming a part of the frame of the harrow, said bars being connected by means of transverse bars 2. It is preferred that the frame of the implement be made of wood, and in this instance the bars 2 preferably consist of transverse boards or planks substantially attached to the members 1, before described. A head-bar 3 is provided for the frame of the harrow, said bar being of flat formation similar to the construction of the bars 2, but inclining forwardly and upwardly from the foremost of the latter, as shown most clearly in the drawings. The front extremities of the longitudinal bars 1 are cut away on the incline, so as to abut with the upper or rear side of the head-bar 3 to rigidly reinforce the latter in a manner which will be readily comprehended.

The frame of the harrow is provided with a plurality of harrow-teeth, as is customary in implements of this type. However, these harrow-teeth are of a peculiar construction especially advantageous for the purpose of the invention, so as to secure the very best results possible. The main harrow-teeth of the implement are indicated at 4, and these teeth consist of flat bodies comprising a shank $4^a$ and a cutting or pulverizing blade $4^b$, extending from said shank. Each of the bars 2 of the harrow has a plurality of these teeth 4 secured to the under side thereof and arranged at intervals the entire length of the bar. The teeth 4 are secured to the bars 2 with the shanks edgewise of said bars, or, in other words, one of the edges of the shank $4^a$ of each tooth 4 is in contact with the under side of the bar 2, to which it may be secured, the several teeth being held in position by means of hook-bolts 5, the shanks of which pass through the transverse bars 2, having the ends 6 threaded to the upper extremities thereof. The hooks 7 of the hook-bars 5 engage over the shanks of the teeth 4, and the nibs of each hook extend into a recess or depression in the under side of the bar 2, to which it may be attached. The several teeth will thus be seen to be very rigidly secured edgewise of the bars 2. The teeth 4 are not only held in place by means of the hook-bolts 5, but the front extremity of each tooth is flattened, as shown at 8, and provided with an aperture through which a bolt or fastening 9 passes, the latter extending through the bars 2. The flattened portions 8 of the several teeth abut with the under sides of the bars 2, affording a bearing which reinforces the edgewise mounting of the said teeth in a manner which will be apparent. The teeth of each of the several bars 2 are arranged in staggered relation with those of the bar immediately in front, the above being an arrangement provided for obvious reasons. The blades $4^b$ of the teeth 4 are sharpened at the lower edges, so as to facilitate the pulverization of the soil under the cutting action of the implement. The blades $4^b$ are arranged at an angle to the shanks $4^a$ of the teeth, the said shanks being disposed in a virtually horizontal plane when the harrow is in operative position, whereas the blades 4ᵇ project downwardly, inclining rearwardly from the shanks, as will be seen clearly in Fig. 3 of the drawings.

The above arrangement and structure of the teeth is extremely advantageous in securing the greatest degree of cutting or pulverizing action of the same as the harrow is being advanced over a field.

The head-bar 3 is provided also with a plurality of teeth, (indicated at 10,) and these teeth are of a form different from those designated 4. The teeth 10 are secured to the bar 3 in substantially the same way as the teeth 4 are secured to the bars 2, and the said teeth 10 are practically straight throughout their length, the lower extremities of the teeth being sharpened and projecting below the bar 3, having virtually the same inclination as the blades 4ᵇ of the teeth 4, due to the inclined position of the bar 3, as before described.

Each of the transverse bars 2 is protected at its front and rear edge by metallic strips 11, secured thereto longitudinally thereof, and the foremost strip 11 of each bar 2 is formed with an opening through which the fastening 9 of each tooth 4 passes. The strips 11, through which the fastening 9 passes, not only afford a protection for the front longitudinal edge of the bar 2, but reinforce the connection between the teeth and said bars.

Having thus described the invention, what is claimed as new is—

In a harrow, the combination of a frame comprising longitudinal and transverse bars, a plurality of flattened teeth embodying shanks secured to the under sides of the transverse bars and arranged edgewise thereof, downwardly-extending blades projected from the rear extremities of said shanks, reinforcing protecting-strips applied to the front edges of the transverse bars, the front extremities of the shanks of the teeth being flattened, and fastenings passing through the flattened front extremities of the teeth, the reinforcing-strips and the transverse bars to secure the teeth to the latter.

In testimony whereof I affix my signature in presence of two witnesses.

CHARLES W. BOLAND. [L. S.]

Witnesses:
 RUSSELL RANDOLPH,
 GEORGE A. WOLF.